United States Patent
Trott

(10) Patent No.: US 10,352,660 B2
(45) Date of Patent: Jul. 16, 2019

(54) VEHICLE SECURITY SHIELDS AND RELATED METHODS

(71) Applicant: Gary R. Trott, Stittsville (CA)

(72) Inventor: Gary R. Trott, Stittsville (CA)

( * ) Notice: Subject to any disclaimer, the term of this patent is extended or adjusted under 35 U.S.C. 154(b) by 0 days.

(21) Appl. No.: 16/045,871

(22) Filed: Jul. 26, 2018

(65) Prior Publication Data

US 2019/0033042 A1     Jan. 31, 2019

Related U.S. Application Data

(60) Provisional application No. 62/537,897, filed on Jul. 27, 2017.

(51) Int. Cl.
| | |
|---|---|
| *F41H 5/14* | (2006.01) |
| *F41H 5/26* | (2006.01) |
| *F41H 5/08* | (2006.01) |
| *F41H 5/04* | (2006.01) |
| *B60J 1/08* | (2006.01) |

(52) U.S. Cl.
CPC .............. *F41H 5/263* (2013.01); *B60J 1/085* (2013.01); *F41H 5/0407* (2013.01); *F41H 5/08* (2013.01)

(58) Field of Classification Search
CPC ........... F41H 5/26; F41H 5/263; F41H 5/0407
See application file for complete search history.

(56) References Cited

U.S. PATENT DOCUMENTS

| | | | |
|---|---|---|---|
| 5,413,026 A | 5/1995 | Madden, Jr. | |
| 5,570,542 A * | 11/1996 | Cameron | B60J 1/2011 160/105 |
| 5,594,193 A | 1/1997 | Sheridan | |
| 5,857,730 A * | 1/1999 | Korpi | F41H 5/226 109/49.5 |
| 6,192,628 B1 | 2/2001 | Pinheiro | |
| 6,230,446 B1 | 5/2001 | Chalich | |
| 6,327,954 B1 | 12/2001 | Medlin | |
| 6,578,305 B2 | 6/2003 | Lebrun | |
| 7,063,374 B1 | 6/2006 | Cameron | |
| 7,114,760 B2 | 10/2006 | Cameron | |
| 7,469,502 B1 | 12/2008 | Steel | |
| 8,176,830 B1 | 5/2012 | Tan | |
| 8,544,209 B2 | 10/2013 | Aschumatat | |
| 9,170,072 B1 | 10/2015 | Riggs | |
| 9,651,340 B1 | 5/2017 | Tunis | |
| 9,982,969 B2 | 5/2018 | Klingman | |
| 2012/0187708 A1 | 7/2012 | White | |
| 2016/0265232 A1 | 9/2016 | Noble | |

\* cited by examiner

*Primary Examiner* — J. Woodrow Eldred

(57) ABSTRACT

Vehicle window security shield assemblies and related methods of use and/or installation. In some embodiments, an insert-shield assembly may comprise an insert-shield with or without a separate inner shield, one or both of which may comprise a ballistic-rated, transparent material. The assembly may be mounted in and/or to one or more existing windows or other openings of a vehicle. In some embodiments, an inner shield of the shield assembly may be removeable from the assembly. In some embodiments, the entire assembly or a portion thereof may be removed to allow an officer or other user to use the removed portion as a portable shield. The removed portion may be returned to the vehicle following use to enhance the protection of the vehicle.

13 Claims, 8 Drawing Sheets

VEHICLE SECURITY SHIELDS AND RELATED METHODS

SUMMARY

Disclosed herein are various embodiments of vehicle security shields, along with related methods of use and/or installation. In some embodiments and implementations, a ballistic-rated, transparent glazing may be either retrofit to, or permanently coupled during automobile manufacturing, with one or more windows of a vehicle, such as a police vehicle or another security vehicle. In other preferred embodiments, a portion of the shield, or the entire shield, may be removeable from the vehicle to allow an officer or other user to use the shield or shield portion as a portable, personal shield.

Preferably, the shield will either completely absorb or substantially reduce the kinetic energy of bullets or other projectiles to either keep the vehicle occupants safe, or at least reduce the severity and/or possibility of such injury. The insert-shield may also prevent or at least inhibit vehicle break-ins. Preferably, the insert-shield is installed so as to be spaced apart from the vehicle's original/existing glass in order to allow the original glass to operate as normal.

In some embodiments comprising two shield-layers, one of these shields (such as preferably an interior shield) may be removably coupled with the outer and/or primary insert-shield. For example, a sliding mechanism may be used such that the interior shield can slide out and be used as portable protection away from the vehicle. The interior shield may therefore comprise one or more handles to allow the insert-shield to be carried and used as a portable, personal shield.

In other embodiments comprising two or more shield-layers, the interior shield may be permanently coupled with the outer insert-shield and be configured so as to be installed and removed without tools in seconds and may be transferred to and used in another like-vehicle.

In other embodiments, the insert-shield may be of sufficient thickness itself to meet the minimum level of perceived threat.

In some embodiments, the outer insert-shield may comprise a CNC-fabricated flat panel of suitable, ballistic-grade material. The material used for the outer shield may vary in thickness around certain portions of the perimeter and/or on the main body. More particularly, the outer shield may either be formed with reduced thickness portions, such as flanges, at the top and/or bottom, or such flanges may be coupled to the top and/or bottom of the shield or such flanges may be routed from an original piece of material. These portions may allow the outer shield to be inserted into the existing space/groove between the inner door panel and the original/existing glass.

Preferably, the outer insert-shield is cut to fit/match, or at least substantially match, the shape of the original/existing window, but may exceed the height of the original window/opening slightly, such as, for example, by about between an inch and about two inches. At the top of the outer insert-shield, the flange may be bonded and/or mechanically attached to the door frame, such as in some embodiments with a very high bond (VHB) tape or a VHB-type attachment with hooks and loops (Velcro®) or Dual-Lock®, which may allow the outer shield to be quickly removed if desired. Preferably, the upper flange is positioned and configured so that it not only is positioned adjacent to the door frame, but also is thin enough so that it can be pinched and/or compressed between the door frame and the body frame of the vehicle (such as the rubber door gasket) without impeding the door from being fully closed.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Apparatus, methods, and systems are disclosed herein relating to vehicle ballistic security. More particularly, vehicle ballistic security shields are disclosed herein that may be applied to existing vehicles, such as police vehicles or other security vehicles, or may be installed as such vehicles are manufactured, to provide protection from bullets, other projectiles, and/or unauthorized entry. In some embodiments, the security shield may include two independent shields/layers. In some such embodiments, one of these shields/layers may be removable to allow for use as a portable shield. In still other embodiments, shield layers may be rigidly coupled together via bonding and/or mechanical fasteners and act as one unit that may be inserted in vehicle door window frames for ballistic protection and removed to become a personal security shield.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1:
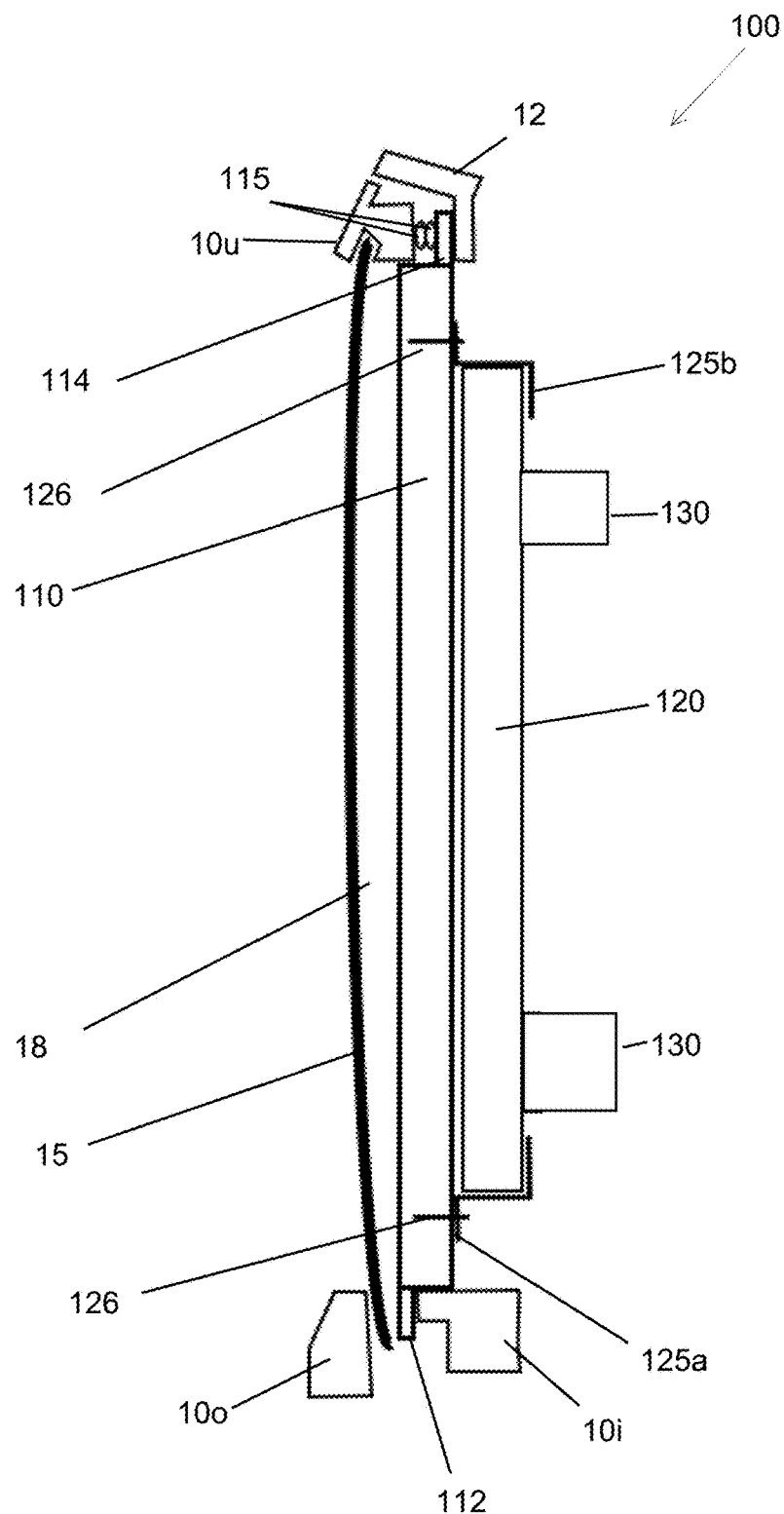
FIG. 1 is a cross-sectional view of a vehicle security insert-shield assembly coupled with a vehicle door frame adjacent to an existing window of the vehicle according to some embodiments.

FIG. 1 depicts a first embodiment of a vehicle security insert-shield assembly 100 positioned within a window frame 10 (consisting of interior panel 10i, outer panel 10o, and upper door frame 10u) of a vehicle. Window frame components 10i/10o/10u may be, in some preferred embodiments, defined by a door frame of the vehicle. As shown in this figure, insert-shield assembly 100 comprises two shield portions, namely, a first insert-shield portion 110, which may comprise an outer (relative to the vehicle) insert-shield 110, and a second shield portion 120, which may comprise an inner shield 120. As described in greater detail below, in some embodiments, one of these shields may be removable from the vehicle. For example, in some embodiments, inner shield 120 may be removed from the vehicle to allow for an officer or other vehicle occupant to use inner shield 120 as a portable shield.

Outer insert-shield 110 may be preferably, permanently, or at least more permanently, coupled with the vehicle. Thus, in some embodiments, outer insert-shield 110 may be machined or otherwise formed within an upper and/or lower portion that may be positioned within an opening within the vehicle. Thus, as shown in FIG. 1, outer insert-shield 110 may comprise a lower flange 112 configured to fit and be received within a space/groove (a window retraction slot) formed between existing and/or original glass 15 of the vehicle and a portion of the vehicle, such as the vehicle door panel/frame 10i. The opposite side of the outer insert-shield 110, which in the depicted embodiment comprises the upper side (alternative embodiments are contemplated in which the preferred positioning/configuration may be reversed), may then be bonded or otherwise rigidly coupled with the upper portion of the window/door frame 10u. In some embodiments, one or more screws or other fasteners 115 may be used. In some embodiments, either in addition or as an alternative to such fasteners, a tape may be used, such as a double-sided, very high bond (VHB) tape. In still other embodiments, a removable tape or other means for coupling may be used such as VELCRO® or another hook-and-loop material or Dual-Lock®. This may allow for removing the entire shield assembly 100 if desired.

The upper end of outer insert-shield 110 may also be machined or otherwise formed with a reduced thickness flange 114. This may allow the vehicle door to continue to close following installation. Preferably, the thickness of flange 114 is such that it can be positioned between the chassis door frame 12 and the window/door frame 10 when the door is closed. Because the preferred thickness of the main body of the outer insert-shield 110 would not allow the door to be closed in this manner, providing a reduced thickness flange 114 may be useful. In preferred embodiments, flange 114 may have a thickness of between about 0.12 and about 0.5 inches. In some such embodiments, the thickness of flange 114 may be about 0.25 inches. However, these dimensions, along with various other dimensions set forth herein, may vary as needed in accordance with different vehicle specifications.

It is preferred that outer insert-shield 110 be formed to have a shape that is at least as big as and/or matches, or at least substantially matches, that of the existing window/glass 15, at least in two dimensions (as discussed below, unlike typical vehicle windows, shield 110 may be flat in the third dimension). This is preferable to avoid regions in the existing window/glass 15 that are left unprotected by assembly 100 and therefore may allow for projectiles to pass therethrough and/or may allow for unauthorized vehicle entry.

Outer insert-shield 110 (and inner shield 120 if desired) are preferably made up of a transparent glazing material to allow it to be positioned adjacent to (internal to) a vehicle window/glass so that the officer/driver/occupant can be protected by assembly 100 and still be able to look out of the window. The material used is preferably bulletproof, or at least bullet resistant so as to serve as a ballistic protective barrier. In preferred embodiments, a transparent, polycarbonate plastic or combination of various laminated plastics (which may contain ceramics and/or acrylics) may be used, such as ballistic-grade, Bayer® Makrolon® polycarbonate sheets. In preferred embodiments, the thickness of outer shield 110 may range from between about 0.5 and about 1.25 inches. In some such embodiments, the thickness of outer insert-shield may be about 0.5 inches.

The inner shield 120 may be thicker than or thinner than the outer insert-shield 110. Thus, in preferred embodiments, the thickness of inner shield 120 may range from between about 0.5 and about 1 inches. In some such embodiments, the thickness of inner shield 120 may be about 0.75 inches.

In certain preferred embodiments, the combination of the two layers/shields may be sufficient to satisfy at least level the minimum level of protection specified by a customer. In preferred embodiments, the minimum level of protection may be Level 1 of the Standard Underwriters Laboratory Protection Level Ratings for bullet-resistant systems or Level IIIA from the National Institute of Justice ("NIJ"). The tradeoffs are a balance between the weight of the assembly and the minimum protection provided against various types of threats ranging from a hand-gun to a rifle. For example, a material thickness may be 0.500" may be necessary to protect against a 0.9 mil handgun and perhaps up to 2.500" of material to protect against rounds from certain rifles. In some embodiments, it may be preferable for the outer shield to be approximately 0.500" thick, protecting against lower caliber weapons, with a smaller (in area) inner shield that may be 1.250" thick positioned to protect the head and torso from higher caliber weapons. The thicknesses of each of the outer insert-shield and inner shield may vary depending upon customer specifications. Thus, this layered shield would have an overall lower weight than if the entire outer insert-shield were 1.500" thick.

In embodiments configured to be applied to side windows of police cars or other vehicles, it is also preferable that shield assembly 100 be coupled with a vehicle so as to allow the original/existing window to be operational following installation. In some embodiments, this may be accomplished by, for example, providing a spacing/gap 18 in between the original window/glass 15 and the outer surface of outer shield 110, as shown in FIG. 1. In addition, or in some embodiments, alternatively, outer shield 110 may comprise a flat sheet. Because vehicle windows are typically bowed, providing a flat outer shield 110 may be used to provide this spacing/gap 18.

Figure 2:
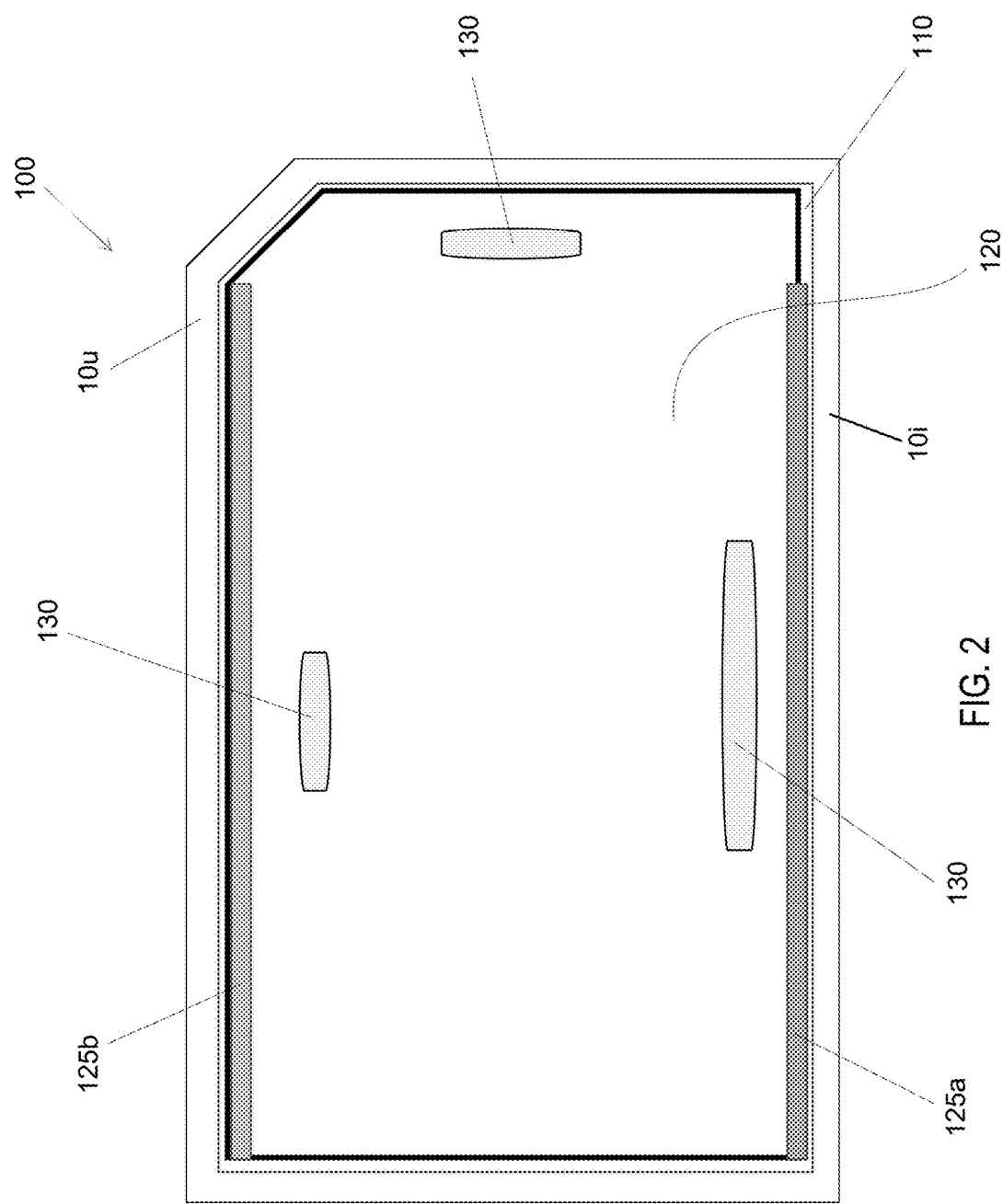
FIG. 2 depicts the vehicle security insert-shield assembly of FIG. 1 shown from the perspective of the interior of the vehicle.

As also shown in both FIGS. 1 and 2, assembly 100 may further comprise a holster 125, which is an example of means for releasably coupling inner shield 120 to outer shield 110 and/or the vehicle. In the depicted embodiment, this releasably coupling means or holster comprises a pair of rails 125a and 125b that are configured to slidably receive inner shield 120. Rails 125a/125b may be permanently coupled with outer shield 110 in a variety of different ways, such as using adhesives, VHB tapes or other tapes, rivets, bolts, screws, or other fasteners 126, or the like. Rails 125a and 125b may comprise L- or U- or Z- or H-shaped coupling members that create a channel to slidably receive the inner shield 120 therein.

More particularly, in practice, when it is desired to remove inner shield 120 for use as a portable shield, inner shield 120 may be slid parallel to the vehicle window 15 and the outer shield 110 (with the vehicle door open). Similarly, when it is desired to return inner shield 120 to assembly 100, inner shield 120 may be inserted into the channels formed by coupling members 125a and 125b and slid into place behind the outer shield 110. It is contemplated that, in alternative embodiments, a single rail, such as only lower rail 125 may be used. Although in the depicted embodiment the means for releasably coupling inner shield 120 to outer shield 110 and/or the vehicle comprises a means for slidably coupling inner shield 120 to outer shield 110 and/or the vehicle, alternative embodiments are contemplated in which the inner shield may be coupled in alternative ways. For example, in some embodiments, the two shields may be permanently coupled. In other embodiments, the inner shield 120 may be releasably coupled using, for example, a releasable hook and loop or other fastener fabric, one or more groove/projection pairs or any other suitable coupling structure(s). In still other embodiments, only a single shield may be provided.

As also shown in FIGS. 1 and 2, in some embodiments, one or more handles 130 may be coupled (preferably rigidly and/or permanently coupled) to inner shield 120. This may facilitate removal of inner shield 120 from outer shield 110 and/or use of inner shield 120 as a portable shield upon being removed from outer shield 110, as previously described. As shown in FIG. 2, which depicts the interior of assembly 100 coupled adjacent to an inner surface of a vehicle window 15, one or more handles 130 may be positioned adjacent to and extend along upper and/or lower edges/portions of inner shield 120 and one or more handles may be positioned adjacent to and extend along one or both lateral edges/portions of inner shield 120. This may allow an officer or other user to grasp and position the portable inner shield 120 in a variety of different ways as desired. Handles 130 may have a gripping portion and a coupling portion. The coupling portion may be smaller and, in some embodiments, spaced apart from, the gripping portion to allow for gripping. The gripping portion may also be shaped in an ergonomic manner if desired, in some embodiments with a plurality of grooves for receiving a user's fingers. The handle(s) 130 may be rigidly and/or permanently coupled to outer shield 110 and/or another portion of assembly 100 using, for example, SS bolts or other fasteners.

Figure 3:
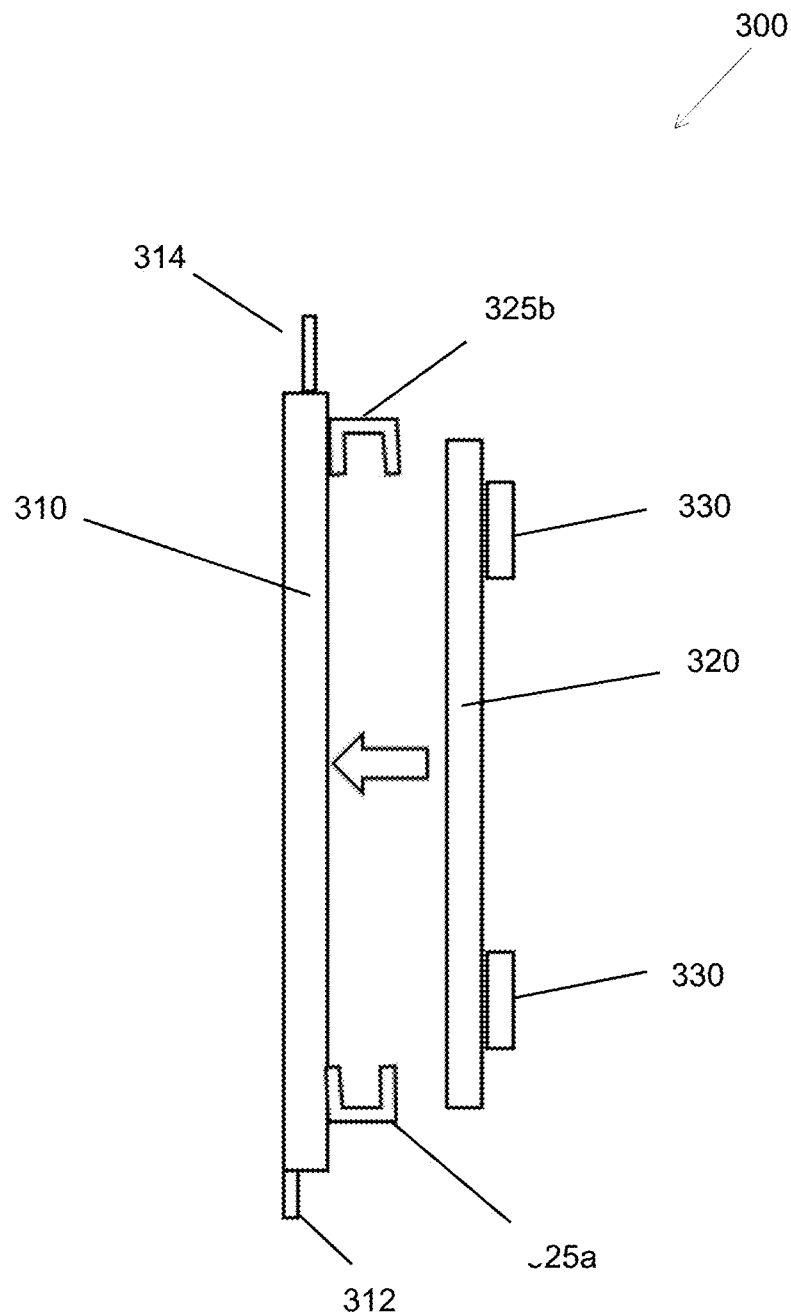
FIG. 3 is an exploded, side elevation view of a vehicle security insert-shield assembly according to other embodiments shown decoupled from a vehicle and with the inner shield of the assembly removed from the outer shield.

FIG. 3 depicts another embodiment of a vehicle security shield assembly 300. Assembly 300 is shown with inner shield 320 removed from outer insert-shield 310. In addition, outer shield 310 is shown decoupled from a vehicle window to which it would ultimately be coupled during operation. By decoupling outer shield 310 from the vehicle, the opposing flanges 312 and 314 at the lower and upper ends, respectively, of outer shield 310, can more easily be seen. In some embodiments, the flanges disclosed herein, including but not limited to flanges 312 and 314, may have a thickness that is between about 20% and about 50% of the thickness of outer shield 310. In some such embodiments, the thickness of flanges 312 and/or 314 may be about half of the thickness of the outer shield 310. As previously described, this may allow for lower flange 312 to be inserted into a space/groove in the window/door frame structure and/or may allow for upper flange 314 to be bonded and/or mechanically attached to the top of the window/door frame without impeding the door's ability to open and close.

Although FIG. 3 appears to show upper flange 314 having the same length (in this cross-sectional view) as lower flange 312, in some embodiments these two flanges may differ in length as needed, and in fact, their relative lengths may be dependent upon and specific to each vehicle's model-type and year. For example, in some embodiments, the upper flange 314 may have a greater length than the lower flange 312. Thus, in some such embodiments, the lower flange 312 may have a length of between about 0.5 and about 1.5 inches. In some such embodiments, the lower flange 312 may have a length of about 1 inch.

Similarly, in some embodiments, the upper flange 314 may have a length (in this cross-sectional view) of between about 0.5 inches and about 1.5 inches. In some such embodiments, the upper flange 314 may have a length of about 1.5 inches. In some such embodiments, or in alternative embodiments, thus, assembly 300 may be configured such that the upper flange 314 exceeds the height of the original/existing vehicle glass by between about 0.5 and about 2 inches. In some such embodiments, assembly 300 may be configured such that the upper flange 314 exceeds the height of the original/existing vehicle glass by about 1.5 inches. As stated previously, the cross-sectional lengths of the upper and lower flanges will be dependent upon and specific to each vehicle's model-type and year.

As with assembly 100, assembly 300 further comprises a pair of channels 325a and 325b that together comprise a holster or means for releasably coupling inner shield 320 to outer shield 310 and/or a vehicle. In the depicted embodiment, these channels may be defined by anodized U-shaped members. However, other structures may be used, such as L-shaped, Z-shaped, and h-shaped members, as well as alternative materials. If sufficiently flexible materials are used, inner shield 320 may be coupled with outer shield 310 by simply pressing inner shield 320 against outer shield 310, as shown in the arrow of FIG. 3. However, in more typical embodiments having rigid channels, inner shield 320 may be coupled with outer shield 310 by inserting one lateral end of inner shield 320 into channels 325a and/or 325b and sliding inner shield 320 into channels 325a and 325b laterally, as previously mentioned.

Assembly 300 may further comprise one or more handles 330, which, as previously mentioned, may be used to facilitate removal of shield 320 and/or be used to facilitate gripping/use of shield 320 as a portable shield following such removal.

Figure 4:
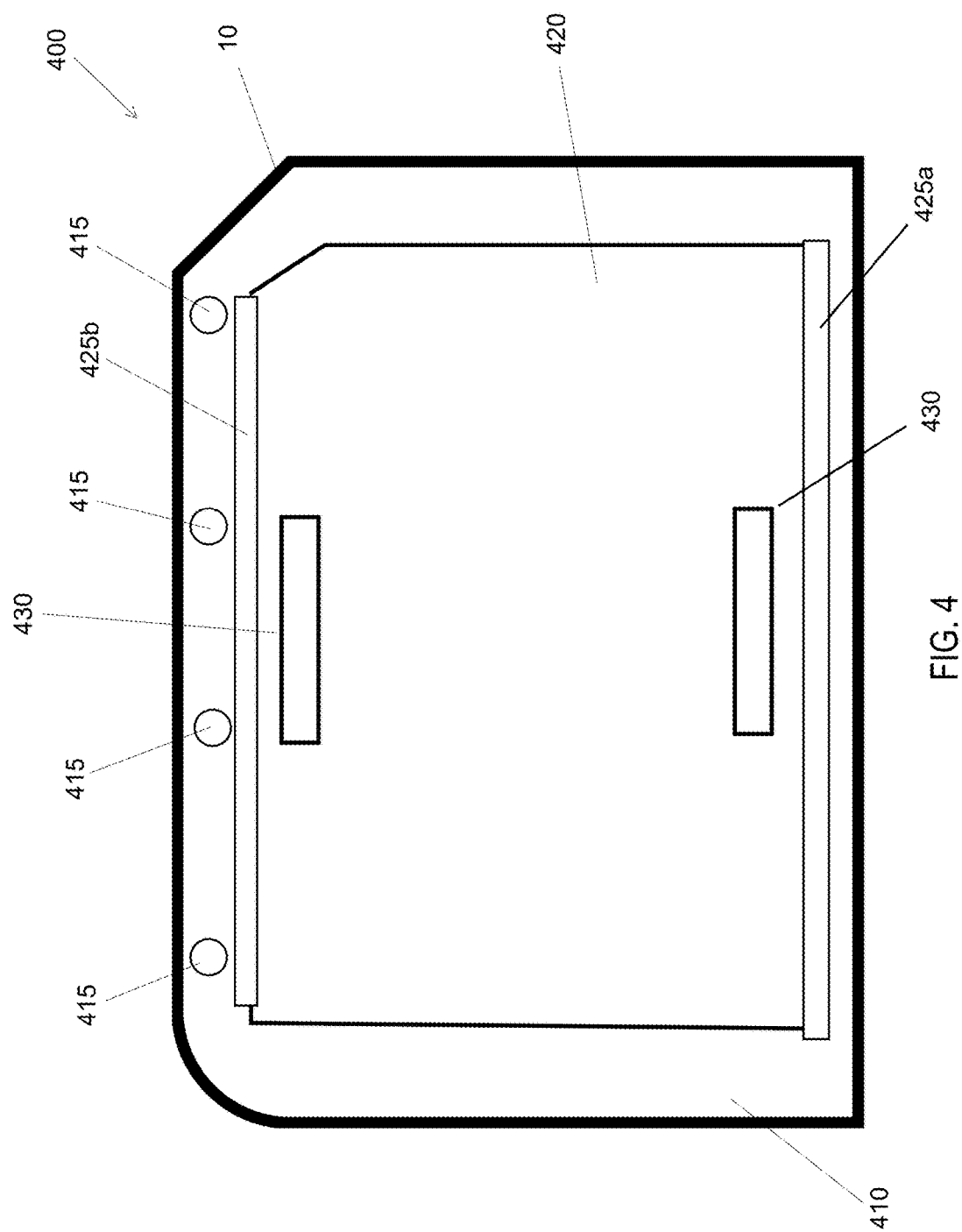
FIG. 4 depicts a vehicle security insert-shield assembly according to yet another embodiment shown coupled to a vehicle and shown from the perspective of the interior of the vehicle.

FIG. 4 depicts still another embodiment of a vehicle security insert-shield assembly 400. Assembly 400 is shown coupled to a window frame 10 of a vehicle door and is shown from the perspective of the inner side of the window. As with previous embodiments, assembly 400 comprises an outer insert-shield 410 and an inner shield 420 configured to be removably coupled with the inner shield 410. This may be accomplished by way of a pair of rails 425a/425b mounted to outer shield 410 so as to slidably receive inner shield 420.

In addition, assembly 400 comprises a pair of handles 430 positioned adjacent to the bottom and top ends of inner shield 420 to facilitate removal and use of inner shield 420 as a portable shield, as previously mentioned.

As also shown in FIG. 4, a plurality of bolts or other fasteners 415 may be used to rigidly and/or permanently and/or temporarily mount outer insert-shield 410 to the window/door frame 10. These fasteners 415 preferably extend along the top portion of outer shield 410 and, as previously mentioned, the bottom portion of outer shield 410 may be positioned in the space/groove between the original/existing window and the door frame 10. FIG. 4 also illustrates that, in preferred embodiments, the inner shield 420 is smaller in height and/or length than outer shield 410, which may allow for placement of fasteners or other coupling means to mount outer insert-shield 410 without impeding the ability of inner shield 420 to be removed.

In some embodiments, fasteners 415 may comprise quick-release fasteners to allow for the outer shield 410, or the entire assembly 400, to be removed. This may be useful, for example, in order to allow the outer shield 410 to be cleaned. In some such embodiments, the quick-release fasteners may comprise a mounting stud, washers, mounting nuts, and a latching body, which may comprise a quick-release button or other actuation mechanism to allow for release of the latching body. In other embodiments, the fastener may be a quick-release fabric or plastic like Velcro® or Dual-Lock® respectively. The latching body may be mounted to the outer shield 410. Such quick-release fastening assemblies are therefore an example of a means for releasably mounting an outer shield to a vehicle window and/or door frame.

Although not shown in FIG. 4, assembly 400, or any of the other assemblies disclosed herein, may comprise ventilation openings to allow air to move into or out of a vehicle when the original/existing window is down. In some embodiments, such ventilation openings may only be formed in the outer shield 410 to allow air to flow in between the two shields and into or out of the vehicle. In other embodiments, ventilation openings may be formed in both the outer shield 410 and the inner shield 420. In some such embodiments, such openings may be offset from one another such that no openings provide a direct path for bullets or other projectiles into the vehicle.

Figure 5A:
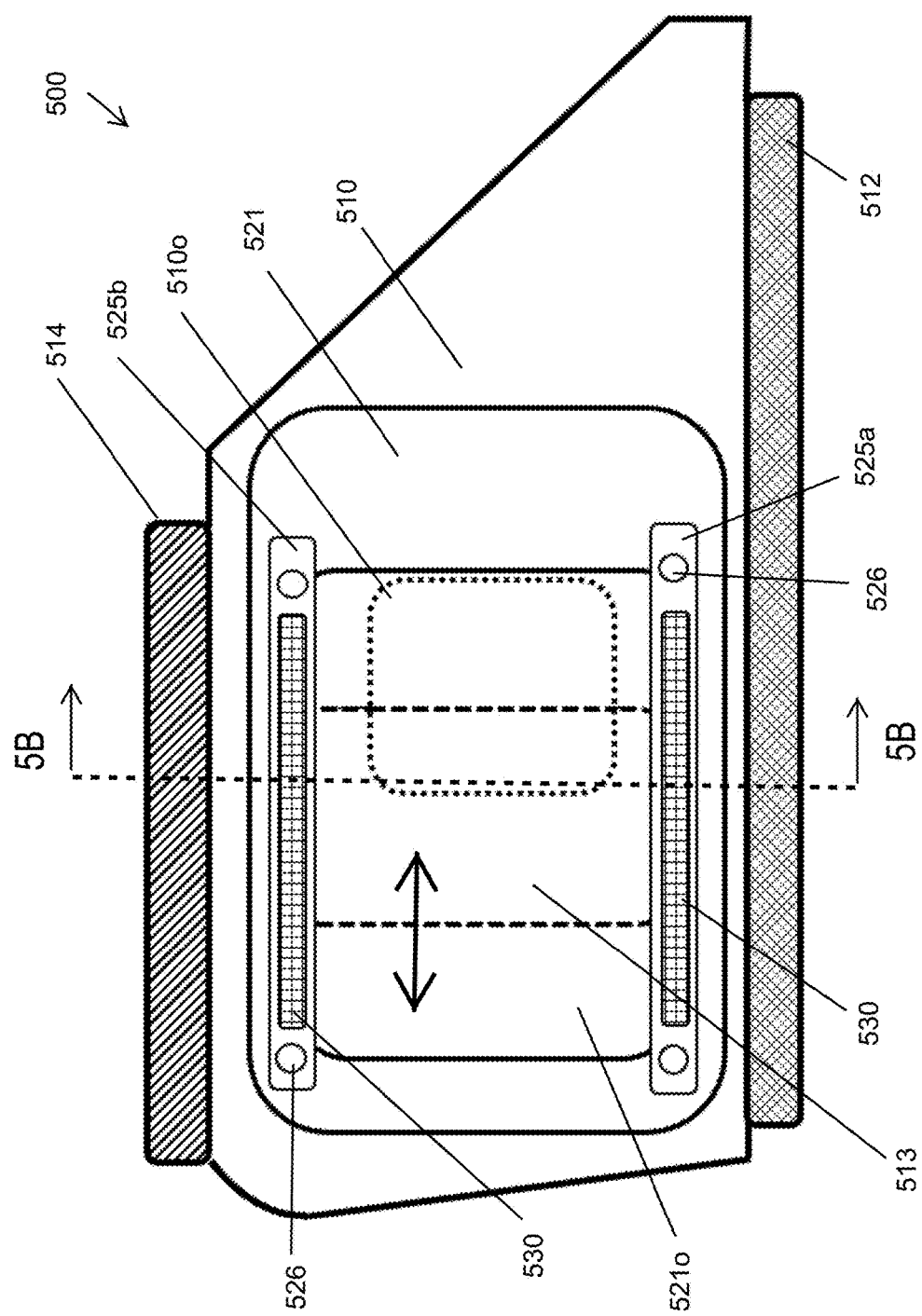
FIG. 5A depicts a vehicle security insert-shield assembly according to yet another embodiment shown from the perspective of the interior of the vehicle demonstrating the additive use of multiple sheets of material.
Figure 5B:
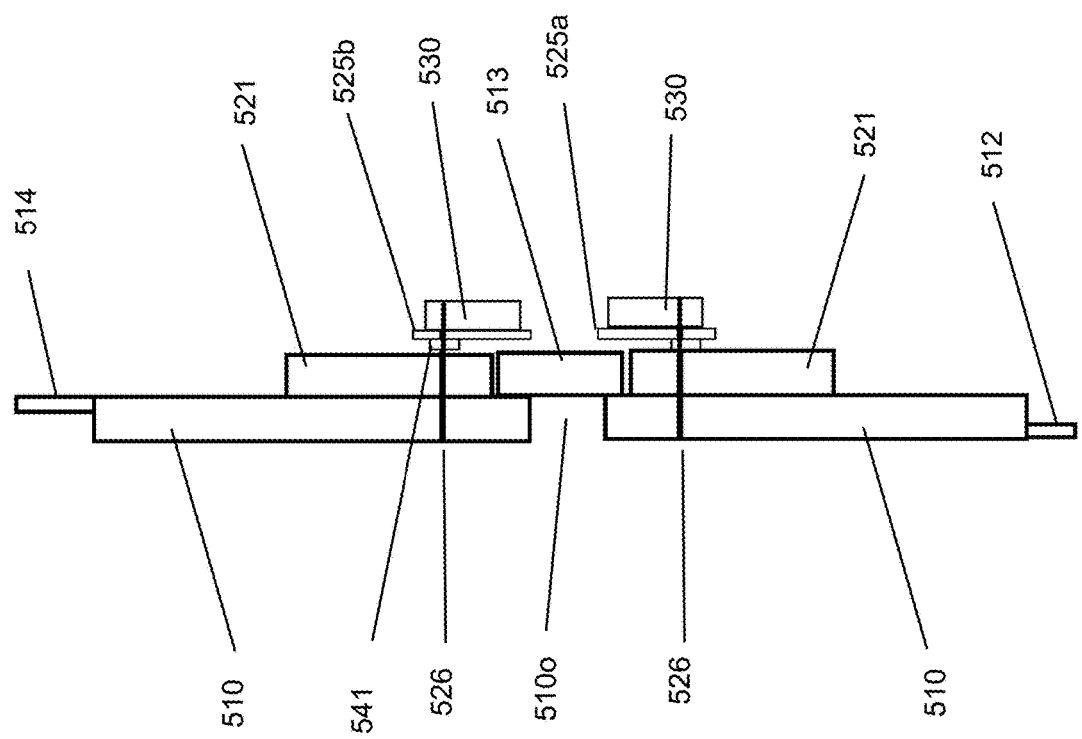
FIG. 5B depicts a cross-sectional, side-elevation view of the insert-shield assembly of FIG. 5A taken at the line 5B/5B.

FIGS. 5A and 5B are still another embodiment of the insert-shield assembly. FIG. 5B is a cross section taken along line 5B/5B shown in FIG. 5A. Assembly 500 comprises 3 main components: the main body, upper flange 514 and lower flange 512. The main body comprises insert-shield 510 that is positioned closest to the stock glass window and all other components coupled with or to insert-shield 510. Inner shield 521 may be comprised of optically clear, ballistic resistant material that is preferably permanently coupled to insert-shield 510 via fasteners 526 that may be through-bolted or bonded or sonically welded to insert-shield 510. The positioning of inner shield 521 is such that protection of the vehicle occupant's head and torso are optimized. The thickness of inner shield 521 may be the same thickness or greater than insert-shield 510. As the overall shield thickness increases, more protection is afforded to the vehicle occupant. In alternative embodiments, inner shield 521 may be relatively smaller than insert-shield 510 in order to lessen the weight for law enforcement personnel that may be more likely to use the invention when defending away from the vehicle.

An opening with direct access to the outside of the vehicle when the vehicle window glass is lowered may provide the benefits of ventilation, the ability to talk to others or pay tolls, or the ability to fire a weapon through the opening from the inside of the vehicle. Insert-shield opening 510o may be substantially overlapped with cut-out 521o in inner shield 521 on one end. Cut-out 521o may serve as a channel for sliding door 513. Sliding door 513 may be comprised of the same material at the same thickness as inner shield 521. As shown with the two-sided arrow, sliding door 513 may be moved to the left to fully expose opening 510 or moved to the right to completely cover opening 510. Bottom rail 525a and top rail 525b may be coupled to inner shield 521 and insert-shield 510 via fasteners 526; said rails serving to act as a holster as previously described to contain sliding door 513 during operation. Spacer 541 may increase the needed space to allow sliding door 513 to move more freely in cut-out 521o. The thickness of sliding door 513 may preferably be sufficient to provide the specified level of protection to the vehicle occupant.

Figure 6A:
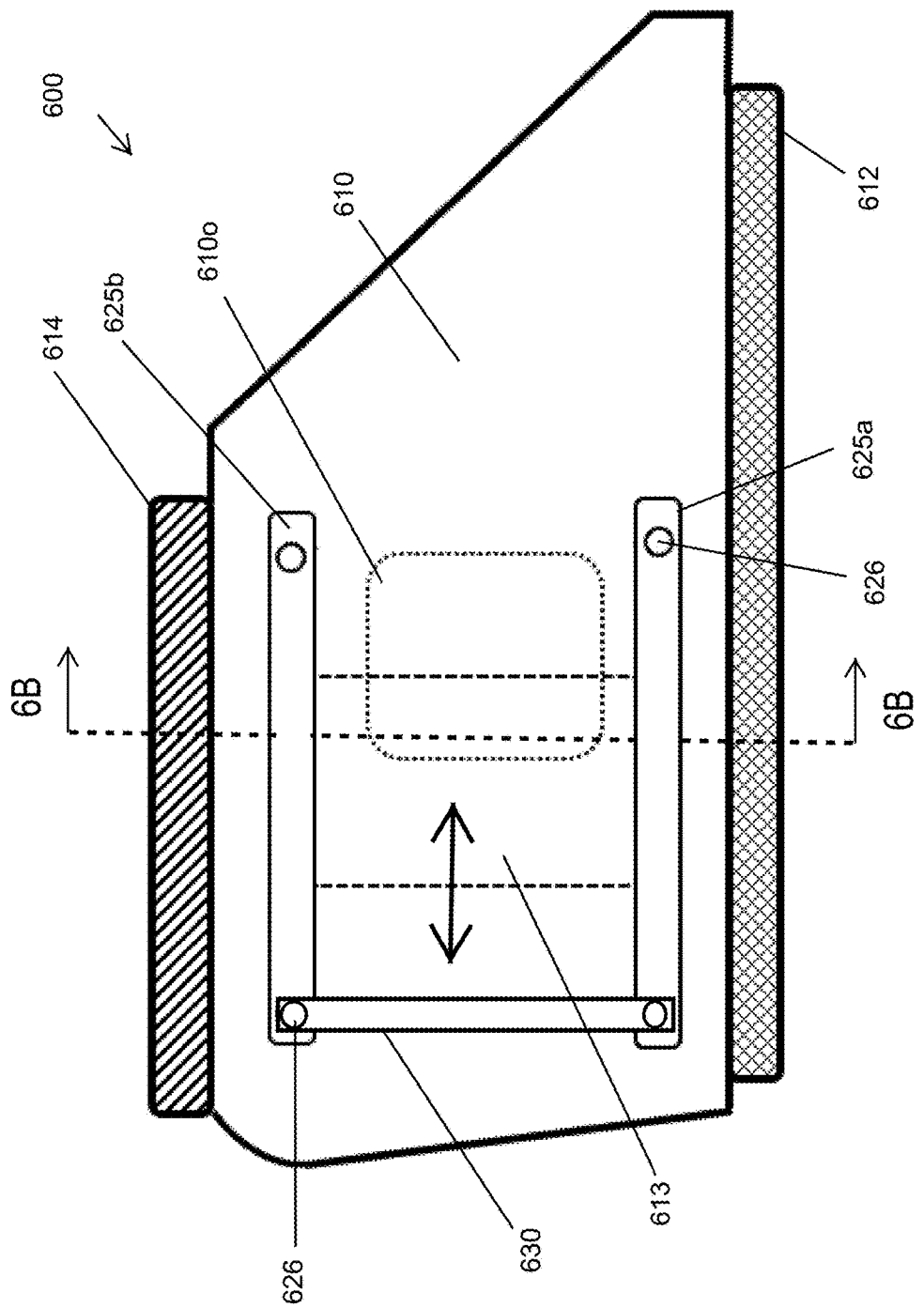
FIG. 6A depicts a vehicle security insert-shield assembly according to yet another embodiment shown from the perspective of the interior of the vehicle demonstrating the use of one, thicker outer insert-shield sheet.
Figure 6B:
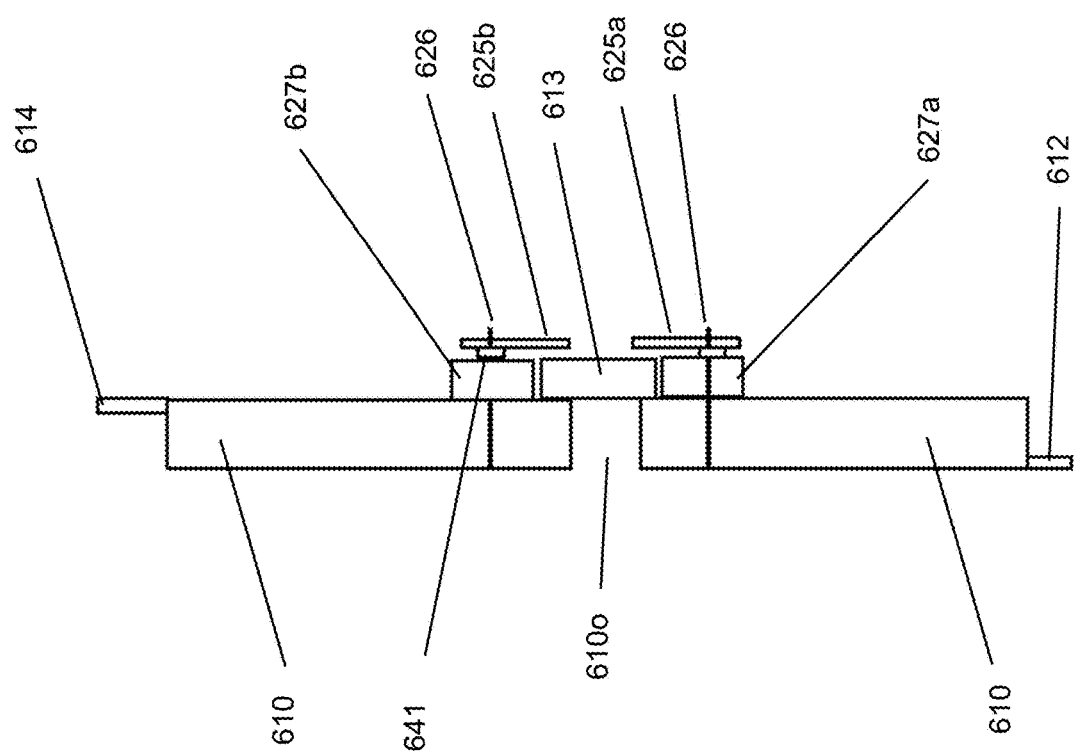
FIG. 6B depicts a cross-sectional, side-elevation view of the vehicle security insert-shield assembly of FIG. 6A taken at the line 6B/6B.

So that the insert-shield assembly 500 may be carried by the user, handles 530 may be coupled along rails 525a and 525b (shown horizontally in the embodiment of FIG. 5A) or between rails 525a and 525b (not shown in FIG. 5A, but would show as vertical components). Handles 530 may be comprised of flexible material that may more resemble straps or more rigid materials that would present as rigid handles. In some embodiments, when the insert-shield is removed for personal protection, the left side of the insert-shield in FIG. 5A may be 'up' which may, by gravity, close sliding door 513 (or ensure it is closed or remains closed) during a fire-fight to ensure maximum protection for the user, FIGS. 6A and 6B are still another embodiment of the insert-shield assembly. FIG. 6B is a cross section taken along line 6B/6B shown in FIG. 6A. Assembly 600 comprises 3 main components: the main body, upper flange 614 and lower flange 612. The main body comprises insert-shield 610 that is positioned closest to the glass window and all other components coupled with or to insert-shield 610. However, in assembly 600, there is no inner shield. This may require an increase in thickness of the insert-shield to provide the protection levels specified for vehicle occupants.

An opening with direct access to the outside of the vehicle when the vehicle window glass is lowered may provide the benefits of ventilation, the ability to talk to others or pay tolls, or the ability to fire a weapon through the opening from the inside of the vehicle.

Insert-shield opening 610o may be covered as needed by sliding door 613 that may be comprised of the same material at the same or a different thickness as insert-shield 620. As shown with the two-sided arrow, sliding door 613 may be moved to the left to fully expose opening 610 or moved to the right to completely cover opening 610. A containment pocket may be created by orienting lower standoff 627a and upper standoff 267b in a manner to contain sliding door 613. Standoffs 627a/627b may be the same thickness as or a thickness slightly greater than sliding door 613. Bottom rail 625a and top rail 625b may be coupled to standoffs 627a and 627b respectively and insert-shield 610 via fasteners 626 and overlap over sliding door 613; said rails serving to act as a holster as previously described to contain sliding door 613 during operation. Spacer 641 may increase the needed space to allow sliding door 613 to move more freely in cut-out 621o. The thickness of sliding door 613 may preferably be sufficient to provide the specified level of protection to the vehicle occupant.

So that the insert-shield assembly 600 may be carried by the user, handle 630 may be coupled from the left side of lower and upper rails 625a and 625b respectively (shown vertically in the embodiment of FIG. 6A; not shown in FIG. 6B as it is not part of the cross section). Handle 630 may be comprised of flexible material that may more resemble straps or more rigid materials that would present as rigid handles. In some embodiments, when the insert-shield is removed for personal protection, the left side of the insert-shield in FIG. 6A may be 'up' which may, by gravity, close sliding door 613 (or ensure it is closed or remains closed) during a fire-fight to ensure maximum protection for the user.

The following may be one method to install, without tools, one or more of the quick-release insert-shield assemblies contemplated herein:

1. The door of the vehicle should be open with its window in the fully retracted position. This further assumes that the mating portion of any fastener system has been affixed to the top of the window frame of the door.

2. Position the back of the lower flange of the insert-shield assembly to the groove into which the window retracts and then lower the remaining forward portion of the lower flange into said groove ensuring that any gaskets/seals are oriented to their proper position, usually pointed 'up'. At this point, the top flange may be 4 to 24 inches away from the top of the door's window frame.

3. Push the upper flange toward the top of the door's window frame until the quick-release fasteners make contact and couple.

The following may be one method to operate one or more of the insert-shield assemblies contemplated herein:

1. Open and close the vehicle door as needed.
2. Open and close the vehicle's stock glass window as needed.
3. Open and close the sliding door of the insert-shield assembly as needed.

The following may be one method to uninstall one or more of the quick-release insert-shield assemblies contemplated herein:

1. Pull the top flange away from the upper portion of the door's window frame until the quick-release fasteners disengage and the angle of the top of the flange is 20 to 45 degrees.

2. Lift up on the insert-shield assembly either uniformly or beginning at one of the two ends and remove the assembly until it is free of the car door frame.

3. If the insert-shield is needed as a personal shield, grasp the handle and rotate the now personal-shield to the proper orientation for use.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention.

What is claimed is:

1. An insert-shield assembly for a vehicle door window opening comprising:

An insert-shield comprising one or more sheets of an optically clear, ballistic-resistant material comprising a main body, an upper flange, and a lower flange wherein
the main body is configured to substantially match the shape of a vehicle window in at least 2 dimensions at a thickness or thicknesses that protect the vehicle occupant against a specified minimum level of ballistic threat,
the lower flange is configured to be a thickness, length, and width and positioned such that the lower flange fits into a window retraction slot between the interior door panel and an existing window glass, and
the upper flange is configured to be a thickness, length, and width and positioned such that the upper flange fits between an upper portion of the window frame of the door and an upper portion of a door frame of a vehicle body and be pinched when the door is in a closed position,
and
one or more fasteners that couples the top flange to the top of the door frame.

2. The insert-shield assembly of claim 1 wherein the insert-shield comprises ballistic-resistant material providing a level of ballistic protection of at least UL Level 1 as defined by Underwriters Laboratory at the date of the filing of this application.

3. The insert-shield assembly of claim 1 wherein the main body of ballistic resistant material is increased in thickness up to 2 additional inches in one or more regions in order to increase the overall ballistic resistance of the one or more regions that will protect especially vital structures of the occupant by the addition of one or more additional sheets of ballistic material or portions of sheets of ballistic material coupled to the main body.

4. The insert-shield assembly of claim 1 wherein the insert-shield comprises ballistic-resistant material comprised of an acrylic, glass, ceramic, or polycarbonate material, or combinations thereof.

5. The insert-shield assembly of claim 1 wherein the insert-shield comprises an opening that is covered by a slidable piece of ballistic resistant material when the opening is covered and at least partially uncovered when the slidable piece of ballistic resistant material is moved from the fully-covered position, said slidable piece being contained by a railing system affixed to the insert-shield and positioned on at least two sides of the slidable piece.

6. The insert-shield assembly of claim 1 wherein the one or more fastener secures the upper flange to the upper portion of the door window frame.

7. The one or more fasteners of claim 6 wherein each fastener comprises one of a quick release fastener or a permanent fastener.

8. The insert-shield assembly of claim 1 wherein the insert-shield comprises a holding mechanism that permits a user to hold the insert-shield in a manner that selves as a personal shield away from the vehicle.

9. The insert-shield assembly of claim 8 wherein the holding mechanism is comprised of a material that may be deformable or rigid depending upon the preferences of an end-user.

10. The insert-shield assembly of claim 1 wherein the window of the vehicle remains substantially operable.

11. A method of ballistically protecting a vehicular window opening, comprising:
    opening the door of the vehicle with the window down;
    providing the insert-shield assembly of claim 1 relative to the inside of the door;
    positioning the lower flange of the insert-shield assembly into the window retraction slot; and
    pushing the top flange of the insert-shield assembly against the upper portion of the door window frame causing the fastening system to engage and hold the insert-shield in position.

12. The method of claim 11 wherein, after completion of all steps, the insert-shield does not interfere with the operation of the window of the vehicle door.

13. The method of claim 12 wherein, after completion of all steps, the insert-shield may be rapidly removed by, comprising:
    opening the door of the vehicle;
    disengaging the fastener by pulling the top flange away from the top portion of the door window frame; and
    removing the lower flange from the window retraction slot.

* * * * *